W. J. TEETERS.
DISK IMPLEMENT.
APPLICATION FILED MAR. 15, 1913.
1,152,061. Patented Aug. 31, 1915.
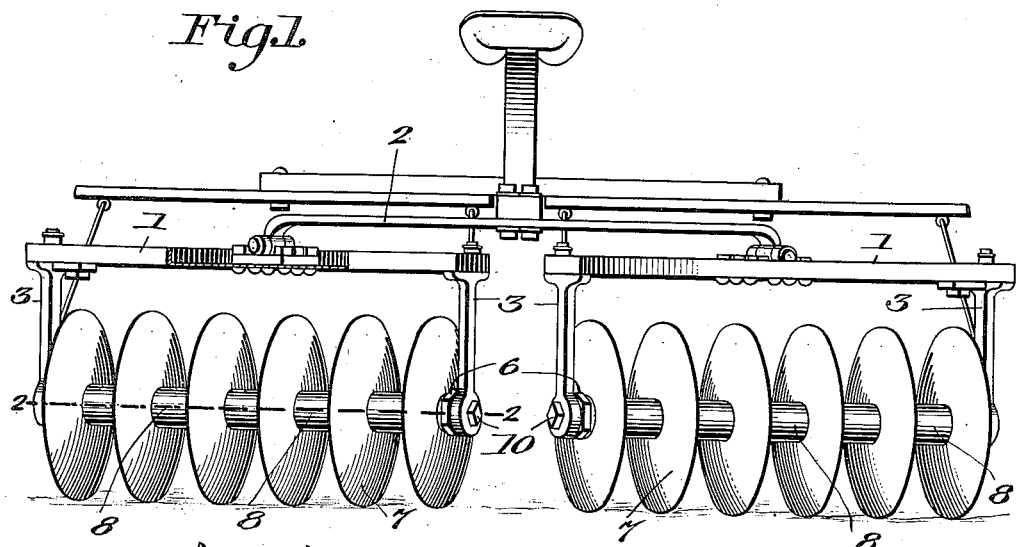
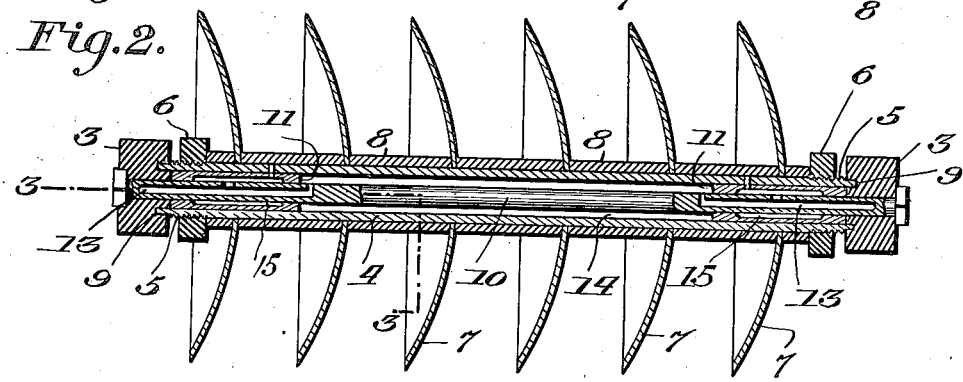
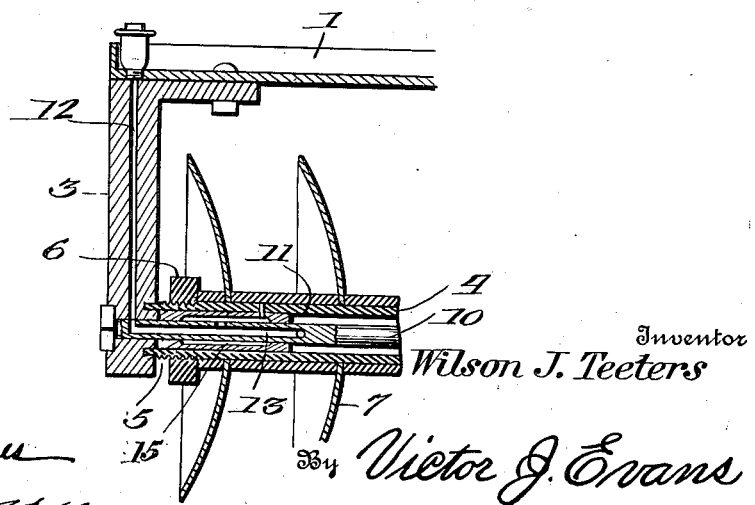
Inventor
Wilson J. Teeters
By Victor J. Evans
Attorney
Witnesses
Philip C. Barnes

UNITED STATES PATENT OFFICE.

WILSON J. TEETERS, OF DECATUR, NEBRASKA.

DISK IMPLEMENT.

1,152,061.  Specification of Letters Patent.  Patented Aug. 31, 1915.

Application filed March 15, 1913. Serial No. 754,435.

*To all whom it may concern:*

Be it known that I, WILSON J. TEETERS, a citizen of the United States, residing at Decatur, in the county of Burt and State of Nebraska, have invented new and useful Improvements in Disk Implements, of which the following is a specification.

This invention relates to disk implements, such as harrows, cultivators and the like, and it has for its principal object to simplify and improve the manner of mounting the disks for rotation.

A further object of the invention is to simplify and improve the manner of mounting the tubular shaft on which the disks are supported.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a rear elevation of a disk implement constructed in accordance with the invention. Fig. 2 is a horizontal sectional view, enlarged, taken on the line 2—2 in Fig. 1. Fig. 3 is a vertical sectional view taken at right angles to Fig. 2 on the line 3—3 in Fig. 2.

Corresponding parts in the several figures are denoted by like characters of reference.

The implement, which has been shown for purposes of illustration, is made up of two sections each including a platform 1, said platforms being hingedly connected with the ends of an arch member 2, whereby they are connected together in such a manner as to be capable of adapting themselves independently to inequalities in the surface of the ground.

Each of the platforms 1 is provided with downwardly extending brackets 3 affording bearings for a tubular shaft 4, the ends of which are threaded, as shown at 5, for the reception of nuts 6. The disks 7 are spaced apart on the tubular shaft 4 by means of intermediate sleeves or collars 8, and it will be seen that by tightening the nuts 6, the spacing sleeves and the disks will be securely mounted on the tubular shaft.

The brackets 3 are provided on their inner faces with circular recesses 9 to receive the extremities of the tubular shafts 4 from which the screw threads have been removed so as to cause said tubular shafts to fit snugly but revolubly in the recesses 9. The brackets 3 are also provided with apertures for the passage of a shaft 10 extending longitudinally through the tubular shaft 4, which latter is provided with interiorly disposed boxes or bearing sleeves 11 snugly engaging the shaft 10. The parts of the device when assembled, will thus be firmly sustained in such a manner that the tubular shafts 4 having the boxes or bearing sleeves 11 will rotate freely about the solid shaft 10, the parts being firmly secured against vibration or wabbling.

It is preferred to provide the brackets 3 with oil ducts 12 communicating with oil ducts 13 in the solid shaft 10, said ducts 13 communicating with the space 14 intermediate the bearing sleeves 11 and also with the cavities 15 of said sleeves. The oil space 14 and the cavities 15 will accommodate a considerable quantity of lubricant, and the bearing sleeves 11 will thus be constantly lubricated, causing the device to operate easily and without friction. The lubricant will also be supplied in such a manner that it will have a tendency to work outward from the bearings and to escape around the ends of the tubular shaft 4, thus counteracting all tendency for dust and impurities to enter and keeping the bearings clean and smooth.

Having thus described the invention, what is claimed as new, is:—

1. A tubular shaft having internal bearing sleeves, a solid shaft extending therethrough, and brackets supporting the solid shaft and having circular recesses accommodating the ends of the tubular shaft.

2. In a device of the class described, a tubular shaft, members mounted on said shaft for rotation therewith, internal bearing sleeves within the tubular shaft, brackets having circular recesses engaging the ends of the tubular shaft, and a solid shaft supported by the brackets and extending through the tubular shaft in engagement with the bearing sleeves.

3. In a device of the class described, a tubular shaft, members mounted on said shaft for rotation therewith, internal bearing sleeves within the tubular shaft, brackets having circular recesses engaging the ends of the tubular shaft, and a solid shaft supported by the brackets and extending through the tubular shaft in engagement with the bearing sleeves, said brackets and solid shaft being provided with oil ducts communicating with the space between the bearing sleeves.

In testimony whereof I affix my signature in presence of two witnesses.

WILSON J. TEETERS.

Witnesses:
L. M. KEARNEY,
J. A. SINGHAUS.